(No Model.)

G. K. CUMMINGS.
PROCESS OF MANUFACTURING GAS.

No. 403,921. Patented May 28, 1889.

WITNESSES.
Joshua Matlack, Jr.
J. W. Hans Powel

INVENTOR,
George K. Cummings

UNITED STATES PATENT OFFICE.

GEORGE K. CUMMINGS, OF PHILADELPHIA, PENNSYLVANIA, ASSIGNOR, BY MESNE ASSIGNMENTS, TO THE UNITED STATES GAS AND FUEL COMPANY.

PROCESS OF MANUFACTURING GAS.

SPECIFICATION forming part of Letters Patent No. 403,921, dated May 28, 1889.

Application filed May 22, 1888. Serial No. 274,680. (No model.)

*To all whom it may concern:*

Be it known that I, GEORGE K. CUMMINGS, of the city of Philadelphia, county of Philadelphia, and State of Pennsylvania, have invented certain new and useful Improvements in the Process of Manufacturing Gas, of which the following is a full, clear, and exact description, reference being had to the accompanying drawings as an illustration of one form of apparatus whereby my process may be operated.

My invention relates to the manufacture of fuel and illuminating-gas by the vaporization of oils, the admixture of superheated steam, and the further addition thereto of certain other gases, as hereinafter detailed and described, the passing of this mixture through retorts heated to a high temperature, and the further passing of the retorted gas through crude petroleum, the lighter vapors of which are driven off and commingled with the retorted gas.

The object of my invention is to produce a simple and inexpensive method for the manufacture of either a fixed gas or gas-vapor, as may be desired.

Figure 1:
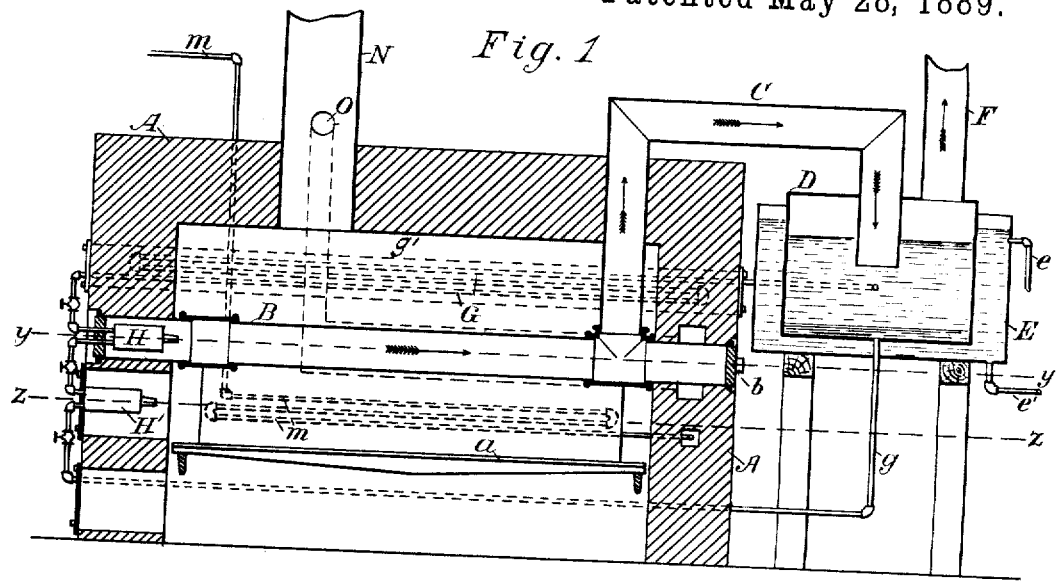
Figure 2:
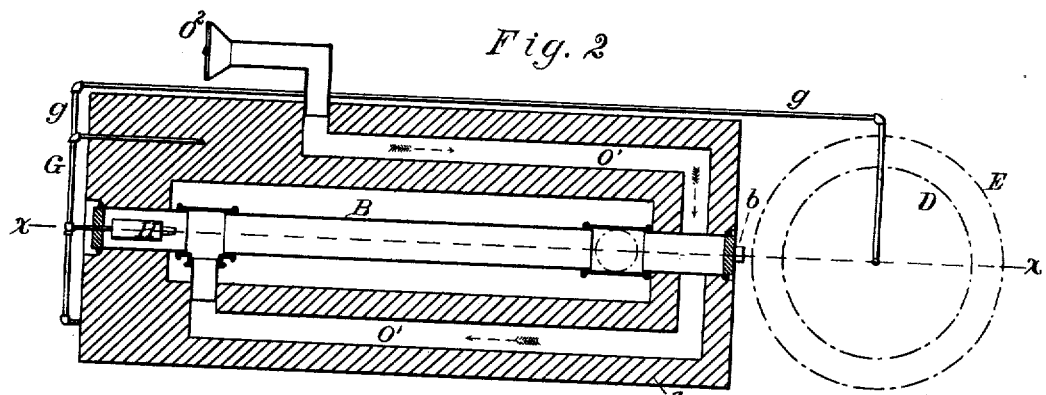
Figure 3:
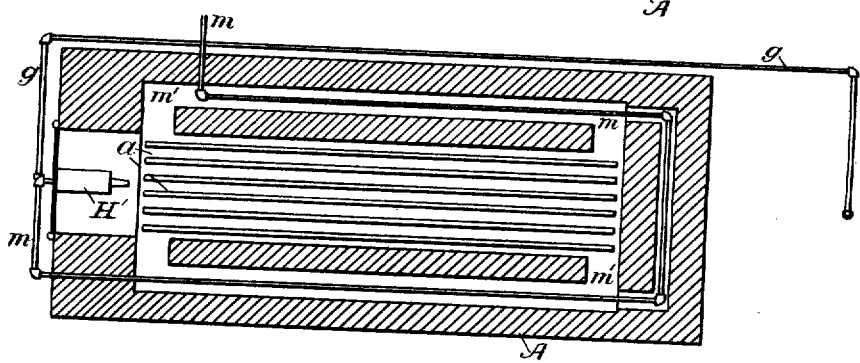

In the accompanying drawings hereto, Figure 1 is a longitudinal vertical section taken on the line $x\ x$ of Fig. 2. Fig. 2 is a horizontal section taken on the line $y\ y$, Fig. 1. Fig. 3 is a horizontal section taken on the line $z\ z$, Fig. 1.

Like letters of reference refer to corresponding parts.

A designates the walls of the furnace, provided with the usual grate, $a$, doors, &c., and constructed of brick.

B designates a retort of any well-known refractory material located in the combustion-chamber, the ends of the retorts supported by the wall of the furnace and provided with plugs $b$, whereby access may be had to the interior of the retorts for cleaning.

C is a pipe connected to the rear end of the retort and leading to a closed tank, D, containing crude petroleum or other hydrocarbon oil. The pipe C extends a slight distance within the body of oil contained in the tank, thereby forming a seal to the end of the pipe. The tank D is located within a refrigerating-tank, E, whereby the oil in said tank may be maintained at any desired temperature.

The refrigerating agent may be water, an air-blast, or any of the well-known equivalent temperature-reducing mediums, including those used in ice-making machines. The desired temperature of the oil is a quantity varying with the kind of oil or other hydrocarbon used, and ranges from, say, about 180° Fahrenheit to just below the temperature of the hot gas coming from the retort. The temperature of the refrigerant should be such as to maintain the hydrocarbon in the closed tank at about a specific gravity of from, say, 24° to 27° Baumé.

$e\ e'$ indicate inlet and outlet pipes, or vice versa, for the refrigerating material, whereby a continuous flow of a cooling material may be effected.

F is the outlet-pipe for the gases, communicating with the closed tank D, and may lead to a fixing-chamber, a gasometer, or directly to the point of consumption, as desired.

G is a pipe connected to the oil-tank and communicating with the injector H, and is located in a flue, $g'$, in the furnace-wall, whereby the oil may be further heated and vaporized on its passage from the tank to the injector. It is obvious that the coil need not necessarily be located within the flue, but may be placed entirely on the outside of the furnace, and instead of a coil a single pipe may be employed. A pump (not shown) may be located between the tank and coil and communicating therewith, whereby the oil may be forced through the coil to the injector.

N is a dampered flue communicating with the combustion-chamber of the furnace for purposes hereinafter explained.

$m$ indicates a pipe communicating with the steam-space of a boiler (not shown) and connecting the injector H, said pipe forming a superheating-coil located in flues $m'$, communicating with the combustion-chamber of the furnace, whereby the steam may be superheated on its passage from the steam-boiler to the injector.

O' indicates a superheating-flue located in the walls of the furnace and communicating with a pipe, O, leading from the stack N, whereby the products of combustion may be diverted and intensely heated and delivered to the retort B.

$O^2$ designates a pipe in communication with the open atmosphere or any suitable gas or vapor reservoir.

$g$ indicates a pipe communicating with the tank D and injector H', to which steam is admitted by means of a branch pipe leading from the superheating steam-coil.

In order to operate the apparatus, an ordinary coal-fire is started on the grate-bars, the combustion of which heats the interior of the furnace and the retorts, also transmitting heat to the oil-pipes and the steam-pipes. When the furnace shall have become thoroughly heated, the valve on the steam-pipe being opened, the steam will pass through the steam-superheating coils to the atomizer H, inclosed in the retort, and the oil will pass or be pumped from the tank D through the oil-heating pipe to the atomizer H, whence this mixture, composed principally of hydrogen, oxygen, and carbon, in combination, will be driven by the force of the steam through the heated retort. In consequence of the intimate mixture by means of the atomizer of these two elements, already at a high temperature, being immediately injected into the intensely-heated retort, the decomposition of the steam is the more readily effected, as well as the volatilization and gasification of the oils. This mixture being forced along the retort causes a partial vacuum in the retort-connection at the opening of the flue O', which latter is in communication with the stack N, causing the products of combustion from the furnace to be drawn through the highly-heated flue O' to the retort, where it is commingled with the heated mixture issuing from the atomizer H.

The products of combustion contain in great part carbon dioxide, and also a not inconsiderable portion of the combustible gases which have escaped combustion within the furnace. These gases, being intensely heated in their passage through the flue O' and intimately mixed with the heated carbon vapor formed by the volatilization of the oils and thus passed through the heated retorts commingled, the carbon dioxide enters into combination with the carbon vapor, giving off one-half its oxygen to the carbon, thus forming carbon monoxide, a chemical expression of which combination is $CO_2 + C = 2$, ($CO$;) hence in the retort the following results of combination are obtained: The steam ($H_2O$) is decomposed, giving free hydrogen and oxygen. A large proportion of the hydrogen (rather more than one-fourth) remains free and uncombined. The remainder, together with the hydrogen from the oils, combines with the oil-carbon, forming, first, ethylene, ($C_2H_4$;) second, marsh-gas, ($CH_4$.) The carbon dioxide ($CO_2$) combines with the oil-carbon, forming carbon monoxide, ($CO$.) Some carbon monoxide is drawn unconsumed in the furnace from the stack. The free oxygen of the steam combines with the oil-carbon, also forming carbon monoxide. This quality of gas obviously relates to that leaving the retort through the pipe C, and its value is afterward greatly enhanced by its mixture with the volatile hydrocarbons extracted from the oil in the closed tank D. These combinations would be impossible were not the retort heated to an extremely high temperature, and, on the other hand, were the crude oil in its natural state introduced into a retort so intensely heated its lighter hydrocarbon would be deposited on the interior of the retort in the form of soot or lamp-black. This has heretofore been the great obstacle in converting the crude oils into a gas.

Either the lighter hydrocarbons have been vaporized by retorts insufficiently heated to volatilize the heavier products, which, in consequence, remain as tar in such great quantity that the trial has been a failure commercially, or the crude oil in its natural state has been introduced into a retort sufficiently heated to volatilize the heavier products; but, as a consequence, the lighter hydrocarbons are entirely destroyed by the overheating. This obstacle I have overcome in the following manner: On leaving the retort the heated gases pass through the pipe below the surface of the oil in the closed tank D. The hot gases in passing through a portion of the oil transmit sufficient heat to it to raise it to such temperature that it gives off its lighter hydrocarbons, which escape, together with the hot gases from the retort, through the pipe F, leaving in the tank D the heavier products of the crude oil, which can with safety be introduced into the intensely-heated retorts. Thus the lighter hydrocarbons are introduced into the final gas at the most favorable point, and unsubjected to any injurious intensity of heat, while the heavier products are also utilized and subjected by themselves in the retort to the degree of heat necessary for their volatilization. Moreover, in extracting thus the lighter hydrocarbons before they are subjected to the presence of steam I prevent the breaking up of the compounds of the olefiant gas and thus obviate the forming of compounds of greatly less calorific value. As the hot gases from the retort pass through the oil they deposit therein their tar, which, being of greater specific gravity than the oil in the tank, sinks to the bottom, whence it may be drawn off for any purpose or supplied to the atomizer H' in the furnace-door to continue the heat of the charge of coal when it shall have been consumed.

The oil in closed tank D is kept at any desired temperature by the refrigerating-tank E, which is arranged to surround it, as before described, or a coil through which refrigerating material can be passed may be arranged within the closed tank D; or, if desired, both tank and coil or other refrigerating means may be used. This enables me to control exactly the specific gravity and the quality of the oil to be fed to the retort, and conversely the quality and quantity of the volatile hydrocarbons to be mingled with the retorted gas in the escape-pipe.

When desired, the valve on the pipe O, leading from the stack to the air-duct O', may be closed and the valve or the pipe O² opened and atmospheric oxygen or any other convenient gas or vapor may be substituted for the products of combustion from the furnace.

I do not herein claim the construction described, as such is the subject-matter of another application, Serial No. 274,679, filed May 22, 1888.

What I claim is—

1. The process herein described of manufacturing heating and illuminating gas, which consists in passing highly-heated gases formed by the admixture of steam, oil, and air directly from the retort through a body of crude petroleum maintained at a temperature above, say, 180° Fahrenheit and below that of the incoming gas by a suitable refrigerant, whereby the lighter hydrocarbons of the crude oil are combined with the outgoing gases and the byproducts precipitated, substantially as described.

2. The process herein described of manufacturing heating and illuminating gas, which consists in passing highly-heated gases directly from the retort through a body of crude petroleum maintained at a temperature above, say, 180° Fahrenheit and below that of the incoming gas by a suitable refrigerant, whereby the lighter hydrocarbons of the crude oil are combined with the outgoing gases and the byproducts precipitated, substantially as described.

GEORGE K. CUMMINGS.

Witnesses:
FRANK A. MULLIKIN,
JOSHUA MATLACK, Jr.